United States Patent
Du et al.

(12)
(10) Patent No.: US 6,198,245 B1
(45) Date of Patent: Mar. 6, 2001

(54) LOOK-AHEAD CLOSED-LOOP THERMAL MANAGEMENT

(75) Inventors: Sterling Du, Palo Alto; You-Yuh Shyr, San Jose, both of CA (US); Chuan Chiung Kuo; Shih Ping Yeh, both of Taipei (TW)

(73) Assignee: O₂ Micro International Ltd., Cayman Islands (KY)

( * ) Notice: Subject to any disclaimer, the term of this patent is extended or adjusted under 35 U.S.C. 154(b) by 0 days.

(21) Appl. No.: 09/399,485

(22) Filed: Sep. 20, 1999

(51) Int. Cl.⁷ .............................. H02K 7/20; G01K 17/00; G05B 5/00
(52) U.S. Cl. ..................... 318/471; 318/472; 702/132; 364/175; 361/195; 361/695
(58) Field of Search .................................. 318/471–473; 361/195, 103, 20–34, 687, 688; 364/175, 695, 557, 483, 571.03; 236/446, 49.3; 702/132, 99, 130, 131; 374/134, 137; 713/300

(56) References Cited

U.S. PATENT DOCUMENTS

| | | | |
|---|---|---|---|
| 5,436,784 | * 7/1995 | Schweitzer, III et al. | 361/25 |
| 5,513,361 | * 4/1996 | Young | 395/750 |
| 5,600,575 | * 2/1997 | Anticole | 364/557 |
| 5,644,510 | * 7/1997 | Weir | 364/557 |
| 5,687,079 | * 11/1997 | Bauer et al. | 364/175 |
| 5,835,885 | * 11/1998 | Lin | 702/99 |
| 5,870,267 | * 2/1999 | Kitano | 361/103 |
| 5,875,965 | * 3/1999 | Lee | 236/446 |
| 6,006,168 | * 12/1999 | Schumann et al. | 702/132 |

\* cited by examiner

*Primary Examiner*—Paul Ip
(74) *Attorney, Agent, or Firm*—Donald E. Schreiber, Esq.

(57) ABSTRACT

Thermal management within an electrically powered systems requires monitoring, from time-to-time, both electrical power consumption and temperature within the system. The power consumption and temperature data thus obtained permits developing over time a thermal model for the system. After a thermal model for the system has been thus developed, the model together with the presently sensed electrical power consumption, and the system temperature are used to predict a thermal trend for the system. The predicted thermal trend thus obtained for the system is then used in effecting a temperature control strategy within the electrically powered system.

16 Claims, 3 Drawing Sheets

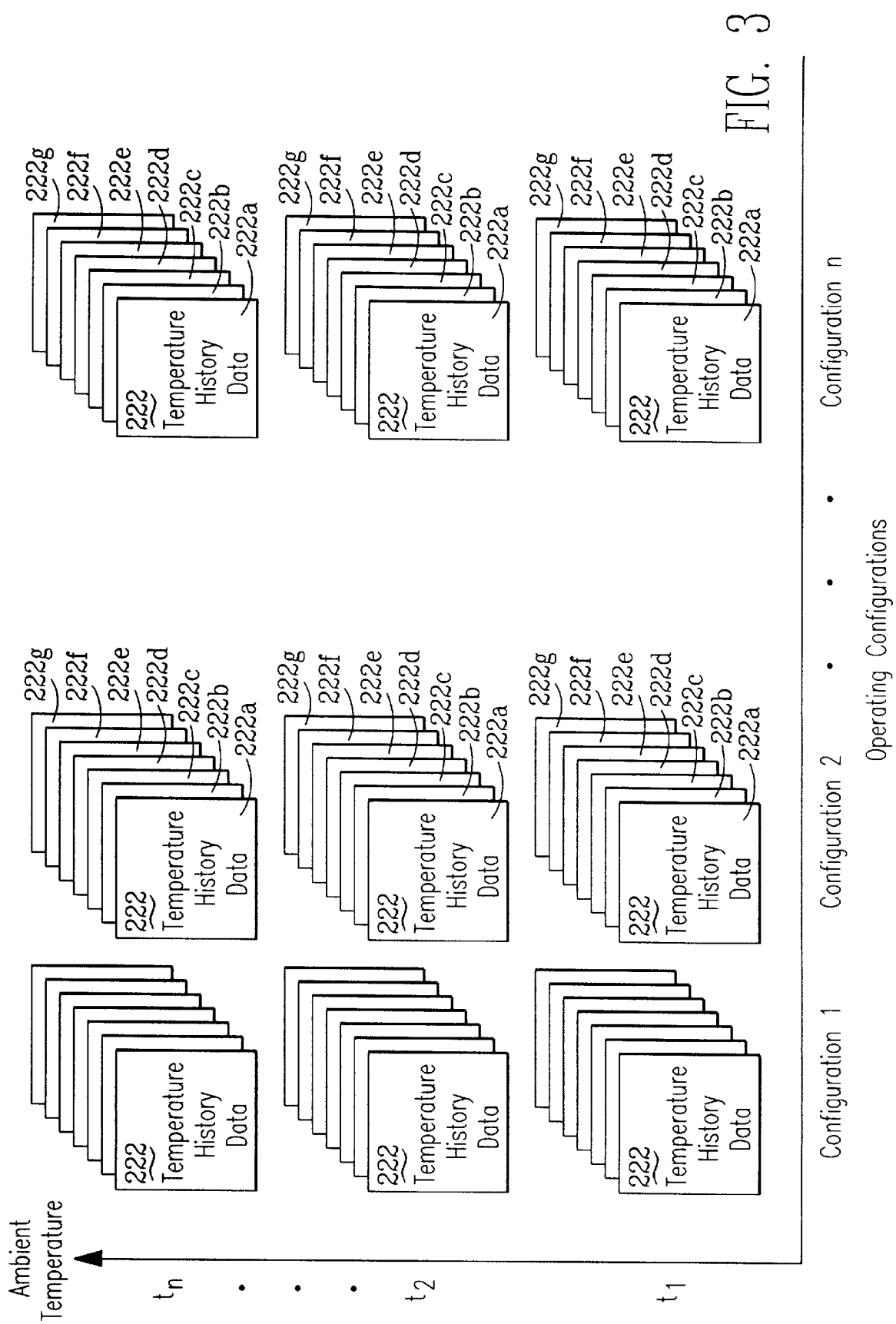

LOOK-AHEAD CLOSED-LOOP THERMAL MANAGEMENT

FIELD OF THE INVENTION

The present invention relates generally to thermal management for systems, and more specifically to look-ahead, closed-loop system temperature control.

DESCRIPTION OF THE PRIOR ART

Presently, the performance of various different types of systems, particularly portable systems such as laptop or notebook computers, depends crucially upon effectively exploiting electrical energy for the system's operation, such as may be stored in rechargeable batteries. To extend as much as practicable the time which laptop and notebook computers may operate without recharging the batteries, conventional laptop and notebook computers typically possess several power-down operating modes. Usually, such devices can be powered down so a central processing unit ("CPU") included in a laptop or notebook computer is almost completely turned-off, with the state of the CPU saved on a hard drive. To resume operation, a very low power portion of the CPU or an auxiliary circuit (e.g. keyboard controller) is typically responds to pressing of a key. The system then reactivates normal power to allow the CPU to retrieve the stored machine state from the hard drive thereby restoring the computer into an operating mode. Some well known power saving modes are called sleep mode, suspend mode and the like.

To effect changes between different operating modes, a power management routine ("PMR") executed by the CPU periodically monitors peripheral devices to assess whether a peripheral device's operation may be suspended. Similarly, if it becomes necessary to access a peripheral device whose operation has been suspended, the PMR must restore that peripheral device to an operating state.

Not only does designing a laptop or notebook computer present problems in electrical power management such as those outlined above, the compact size, tight packaging, and limited ventilation of laptop and notebook computers also pose problems in thermal management. To effect active, as contrasted with passive, thermal management, laptop and notebook computers usually include one or more devices for sensing the temperature of various system components as well as one or more temperature control devices, such as an electrically powered heater or fan, that may be activated responsive to the sensed temperature for altering the component's temperature. Either the PMR, a comparable computer program executed by the CPU, or a comparable system hardware component periodically monitors temperature within the system and then appropriately activates or deactivates the temperature control device(s).

As is readily apparent, higher performance of portable systems, such as laptop or notebook computers, is usually accompanied by increased electrical power consumption and corresponding heat generation within the system. However, since operation of critical system components fail outside of some pre-established temperature range, at some point the need to control the system's temperature dominates system performance and/or electrical power conservation goals. Consequently, for high-performance, battery powered portable systems trade-offs exists between the system's performance, the duration of battery powered operation, and the system's temperature.

The conventional strategy for balancing competing demands among improved performance, longer battery powered operation and system temperature is simply activating one or more temperature control devices, e.g. turning on a fan or a heater, if the temperature sensed for a system component is outside some pre-established range. One difficulty with the preceding thermal management strategy is the size of the thermal protection margin required for critical system components. Because the temperature sensing devices included in the system, e.g. thermistors, are not located at the source of heat generation and also because of the component's packaging, a lag occurs between an increase or decrease in a system component's temperature and a corresponding increase or decrease in the sensing device's temperature. Analogously, a lag also occurs between activating a temperature control device, e.g. turning on a fan or a heater, and a temperature change within a system component.

Consequently, ensuring an adequate thermal protection margin requires that a temperature control device be activated for a system component at a temperature further from the component's temperature limit than would be required if it were possible to predict a thermal trend for the system component, or for the entire system. In practical terms, ensuring an adequate thermal protection margin employing the strategy described above wastes electrical power by requiring that a temperature control device be activated temperature further from the system component's temperature limit than may, in fact, truly be necessary. Moreover, activating an electrically powered cooling device when it is not truly required is doubly wasteful because, not only does its operation consume electrical power, it's operation also generates addition heat within a system. Furthermore, the conventional strategy for thermal management may also increase system manufacturing cost by requiring an excessive number of temperature sensing devices, temperature control devices, and thermal control devices for activating the temperature control devices responsive to the sensing devices' temperature.

BRIEF SUMMARY OF THE INVENTION

The present invention provides an improved strategy for a system's thermal management that reduces electrical power consumption by the system's temperature control devices while ensuring the system's operability.

An object of the present invention is to reduce the thermal protection margin required for system components without increasing the likelihood of system component failure due to operation outside of a pre-established temperature range.

An object of the present invention is to reduce unnecessary consumption of electrical power by systems.

An object of the present invention is to permit construction of simpler systems that employ thermal management.

Briefly, the present invention in one embodiment is a method for thermal management within an electrically powered systems. Implementation of the method requires monitoring from time-to-time both electrical power consumption and temperature within the system. The power consumption and temperature data thus obtained permits developing over time a thermal model for the system. After a thermal model for the system has been thus developed, the model together with the presently sensed electrical power consumption, and the system temperature are used to predict a thermal trend for the system. The predicted thermal trend thus obtained for the system is then used in effecting a temperature control strategy within the electrically powered system.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 3 is a diagram illustrating an ensemble of sets of temperature history data collected for various operating configurations at various ambient temperatures during operation of the battery powerable system that are used in developing a thermal model for the system.

DETAILED DESCRIPTION

Figure 1:
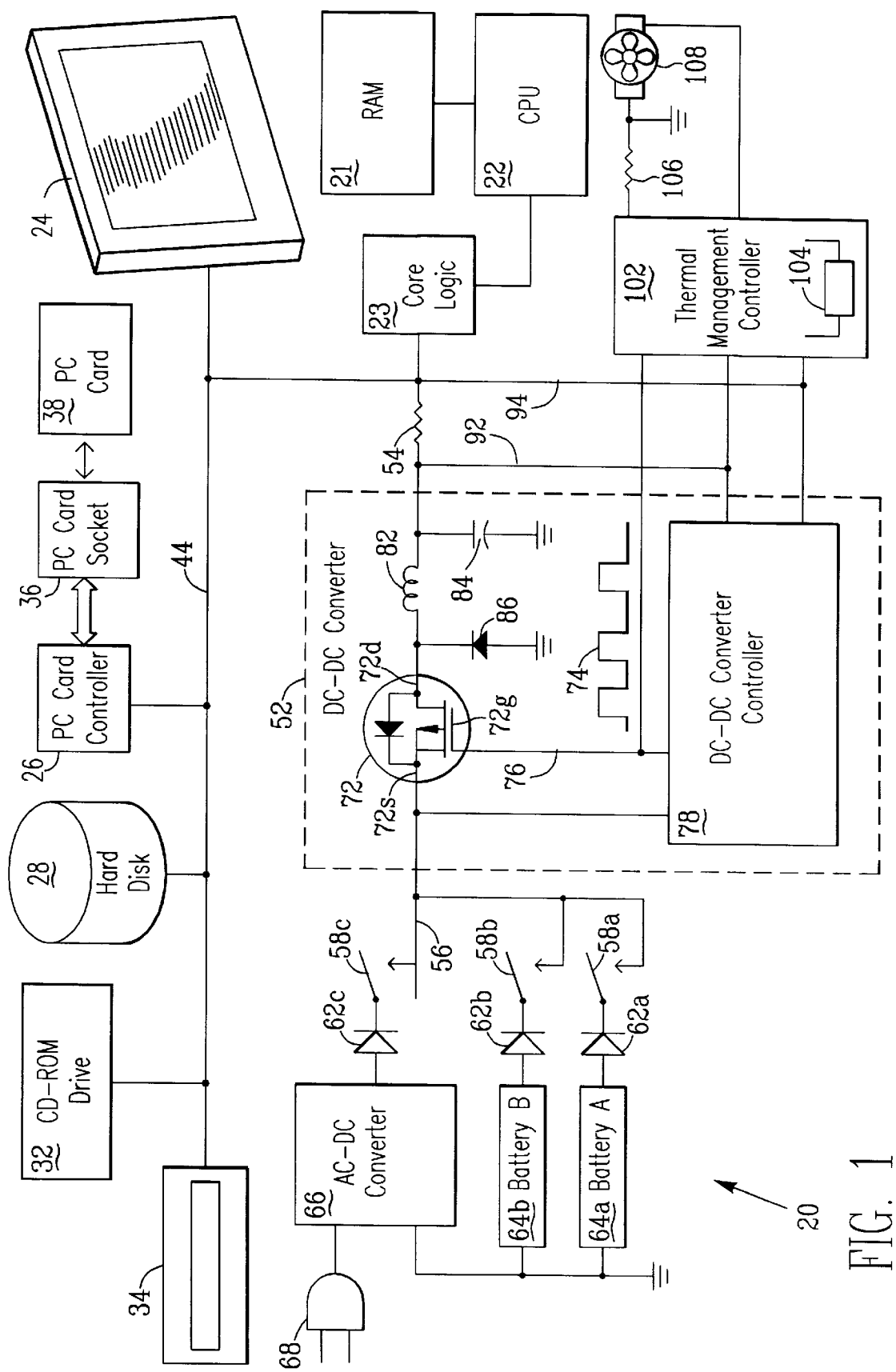
FIG. 1 is a block diagram depicting an exemplary battery powerable system adapted for operation in accordance with the present invention.

FIG. 1 illustrates an exemplary battery powerable laptop or notebook portable computer system referred to by the general reference character 20 that is adapted for operation in accordance with the present invention. The exemplary portable computer system 20 includes various conventional system components such as a random access memory ("RAM") 21, a CPU 22, a core logic IC 23, a backlit liquid crystal display ("LCD") 24, a PC Card controller 26, a hard disk 28, a CD-ROM drive 32, and a floppy diskette drive 34. The PC Card controller 26 connects to a PC Card socket 36 which is adapted to receive a PC Card 38. As is readily apparent to those skilled in the art, various electrical connections necessarily exist among the system components 21–38, which are required for the overall operation of the portable computer system 20, have been omitted FIG. 1 for pedagogical reasons.

Operation of the various system components 21–38 is energized by electrical power supplied thereto via a direct current ("DC") regulated power supply line 44. The regulated power supply line 44 is coupled to a output of a pulse-width-modulated ("PWM") buck converter direct-current to direct current ("DC-DC") converter 52 via a current sensing resistor 54. An input of the DC-DC converter 52 receives electrical power via an input power supply line 56 to which power source selection switches 58a–58c connect. The power source selection switches 58a–58c are individually activatable to select one of various power sources for coupling to the input power supply line 56 respectively through one of several protection diodes 62a–c. In the exemplary embodiment depicted in FIG. 1, power sources of the portable computer system 20 include a pair of batteries 64a and 64b and an alternating-current to direct-current ("AC-DC") converter 66 which receives electrical power via an alternating current ("AC") power plug 68.

As described above, to conserve electrical power particularly when operation of the portable computer system 20 is energized by the batteries 64a and 64b, a PMR executed by the CPU periodically monitors the system components 21–38 to assess whether a particular system component's operation may be suspended. Similarly, if execution of a computer program necessitates accessing a system component whose operation has been suspended, the PMR must restore that component to an operating state. Accordingly, the amount of electrical power supplied via the regulated power supply line 44 for energizing operation of the portable computer system 20 and the heat generated within the various system components 21–38 changes from time-to-time depending upon energization of various system components 21–38 responsive to operational requirements of the portable computer system 20.

The DC-DC converter 52 includes a series switch 72 having a source terminal 72s which receives electrical power from the input power supply line 56. As illustrated in FIG. 1, the series switch 72 is preferably a P-type MOSFET. A PWM electrical signal 74, supplied to a gate terminal 72g of the series switch 72 via a PWM signal line 76 from a DC-DC converter controller 78, repeatedly turns the series switch 72 first on and then off. Operation of the DC-DC converter controller 78, which is usually fabricated as an integrated circuit ("IC"), is energized by electrical power received from the input power supply line 56.

Within the DC-DC converter 52, a drain terminal 72d of the series switch 72 connects to an inductor 82. During each successive interval in which the series switch 72 is turned-on, electrical current flowing into the inductor 82 from the drain terminal 72d increases until the series switch 72 is turned-off. During each successive interval in which the series switch 72 is turned-off, electrical current flowing through the inductor 82 decreases either until electrical current stops flowing through the inductor 82, or until the series switch 72 is again turned on.

While the series switch 72 is turned-on, some of the electrical current flowing through the inductor 82 enters a filter capacitor 84. While the series switch 72 is turned-off, electrical current flows out of the filter capacitor 84. During each successive interval in which the series switch 72 is turned-off while electrical current through the inductor 82 decreases, electrical current flows into the inductor 82 from a free-wheeling diode 86 that connects between the drain terminal 72d of the series switch 72 and circuit ground.

Input terminals of the DC-DC converter controller 78 receive an IP signal and an IM signal from opposite terminals of the current sensing resistor 54 respectively via an IP signal line 92 and an IM signal line 94. The difference in voltage between the IP and IM signals is proportional to the current supplied via the regulated power supply line 44 for energizing operation of the portable computer system 20. To supply well regulated electrical power to the system components 21–38 via the regulated power supply line 44, The DC-DC converter controller 78 varies the characteristics of the PWM electrical signal 74, responsive to the voltage which the DC-DC converter controller 78 receives from the current sensing resistor 54 via the IM signal line 94. To prevent damaging the DC-DC converter 52 by an electrical overload perhaps caused by a short-circuit or component failure within the portable computer system 20, the DC-DC converter controller 78, responsive to the signals which the DC-DC converter controller 78 receives from the current sensing resistor 54 via the IP signal line 92 and the IM signal line 94, also limits the maximum electrical current which the DC-DC converter 52 supplies to the regulated power supply line 44.

The portable computer system 20 as described thus far is completely conventional. However, in accordance with the present invention the portable computer system 20 also includes a thermal management controller 102. Similar to the DC-DC converter controller 78, the thermal management controller 102 as illustrated in FIG. 1 receives the PWM electrical signal 74 via the PWM signal line 76 and the IM and IP signals respectively via the IP signal line 92 and the IM signal line 94. The signals thus supplied to the thermal management controller 102 via the IP signal line 92 and the IM signal line 94 permit sensing both the voltage present on the regulated power supply line 44, and the electrical current which the DC-DC converter 52 supplies to the system components 21–38. Accordingly, at any instant in time the thermal management controller 102 can directly determine the amount of electrical power being consumed by the system components 21–38. FIG. 1 also depicts the thermal management controller 102 as directly sensing the PWM signal present on the inductor 82. Receipt of the PWM signal present on the inductor 82 together with data indicating the voltage present on the regulated power supply line 44 permits the thermal management controller 102 at any instant to indirectly determine both the electrical current and the amount of electrical power being supplied to the system components 21–38. Consequently, in either one or the other of these two ways the thermal management controller 102 can from time-to-time monitor both the electrical power consumption and correspondingly the amount of heat being generated within the portable computer system 20. In addition, the thermal management controller 102 includes a temperature sensor 104, e.g. an embedded thermal sensor such as a diode or an external thermistor, for sensing ambient temperature at the portable computer system 20.

Though not illustrated in FIG. 1, if the portable computer system 20 is being energized by electrical power supplied by the AC-DC converter 66, the thermal management controller 102 could, in principle, sense an appropriate signal received from the AC-DC converter 66 to indirectly determine at any instant both the electrical current and the amount of electrical power being supplied to the system components 21–38. However, supplying a signal from the AC-DC converter 66 to the thermal management controller 102 is much less preferred because the portable computer system 20 would also have to implement an additional technique for determining the electrical current and the amount of electrical power being supplied to the system components 21–38 during operation of the portable computer system 20 that is energized by the batteries 64a and 64b.

As depicted in FIG. 1, the portable computer system 20 also includes a thermistor 106 which in that illustration is located immediately adjacent to the CPU. The thermistor 106 connects to the thermal management controller 102 thereby permitting the thermal management controller 102 to monitor from time-to-time the temperature within the portable computer system 20 about the thermistor 106.

During normal operation of the portable computer system 20, the thermal management controller 102 from time-to-time monitors electrical power consumption by the portable computer system 20 and the temperature at particular locations within the portable computer system 20, such as at the CPU 22. Each time the thermal management controller 102 monitors electrical power consumption by and temperature of the portable computer system 20, by also obtaining data about the operating state of the portable computer system 20 from the PMR the thermal management controller 102 may tabulate and preserve in permanent storage, such as on the hard disk 28, temperature history data, such as that illustrated in Table 1 below, that records operating conditions within the portable computer system 20.

TABLE 1

| Thermal Dissipation Data | Measured Quantity |
|---|---|
| Power Consumption | X watts |
| Temperature at location 1 | $t_1$ ° C. |

TABLE 1-continued

| ... | ... |
|---|---|
| Temperature at location n | $t_n$ ° C. |
| Ambient Temperature | $t_n$ ° C. |

| System Component | Operating Status | |
|---|---|---|
| CPU 22 | On | On or off |
| | Sleep | On or off |
| | Suspend | On or off |
| LCD 24 | | On or off |
| PC Card controller 26 | | On or off |
| hard disk 28 | | On or off |
| CD-ROM drive 32 | | On or off |
| floppy diskette drive 34 | | On or off |

During normal operation, the thermal management controller 102 may analyze an ensemble of such temperature history data collected over time to develop therefrom a thermal model for the portable computer system 20. The thermal model thus developed may then be used by the thermal management controller 102 for predicting a thermal trend that will likely exist during subsequent operation of the portable computer system 20. A computer program, presumably the PMR, executed by the CPU 22 may then employ the predicted thermal trend to effect a temperature control strategy within the portable computer system 20, such as transmitting a command to the thermal management controller 102 which turns on a fan 108 for cooling the CPU 22.

Figures 2, 4:
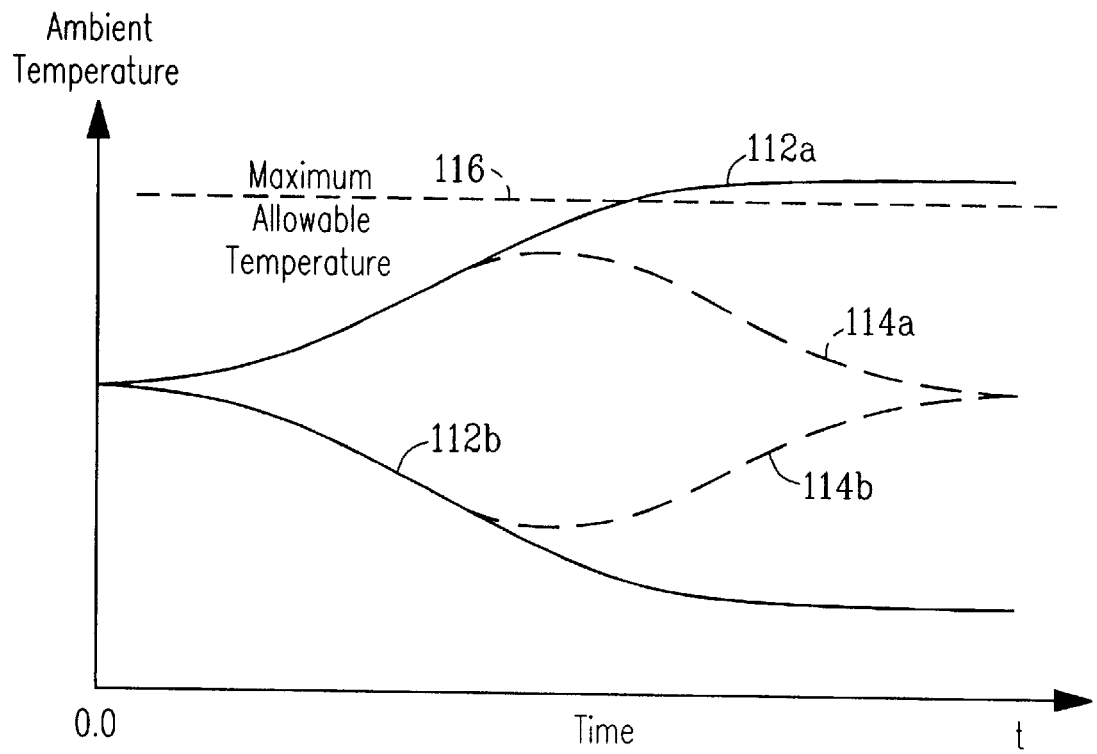
FIG. 2 is a graph exemplifying possible thermal trends within the exemplary battery powerable system following a change in the system's operating configuration.
FIG. 4 is a diagram illustrating one time-temperature record of the type collected for the temperature history data.

FIG. 2 illustrate two (2) possible thermal trends within the portable computer system 20 following a change in the system's operating configuration such as turning on or off the hard disk 28, or any other component included in the portable computer system 20. In that illustration, ambient temperature within the portable computer system 20 increases along a vertical line located at the left hand edge of the graph, and time increases horizontally from left to right across the graph.

As indicated in FIG. 2 by the graphs 112a and 112b, assuming that the ambient temperature within the portable computer system 20 has reached equilibrium, that temperature does not instantaneously begin to increase or decrease immediately after turning a component on or off at Time= 0.0. Rather, initially after a the operating configuration of the portable computer system 20 changes a lag interval elapses during which temperature changes only slightly. This lag interval occurs because usually a source of heat generation within the portable computer system 20 is enclosed within some packaging which has thermal mass and which insulates the heat generating source both mechanically and thermally from the atmosphere within the portable computer system 20. Only after the heat generating source heats-up or cools-down the packaging does the heating or cooling trend alter in the ambient temperature within the portable computer system 20. As temperature within the packaging material warms or cools, after the lag interval, whose duration depends to a significant extent upon the insulating properties of the packaging, the increase or decrease in heat generation begins to rapidly change the ambient temperature within the portable computer system 20. After some interval of time, during which the ambient temperature rises or falls comparatively quickly, the ambient temperature again reaches an equilibrium at Time=t. If at any time the system's operating configuration were to return to that which existed at Time= 0.0, then over some interval of time the ambient temperature within the portable computer system 20 returns to that which existed at Time=0.0 as indicated by the graphs 114a and 114b in FIG. 2.

Considering the graphs 112a, 112b, 114a and 114b in FIG. 2, it is readily apparent that under most if not all operating conditions it wastes electrical power to increase cooling immediately after an operating configuration change occurs which increases electrical power consumption, and that will undoubtedly, over time, raise the ambient temperature. For example, if the operating configuration that increases electrical power consumption and therefore will ultimately increase the ambient temperature persists for a sufficiently short interval of time, the increase in ambient temperature may be so slight that a change in cooling strategy is unwarranted.

Conversely, if a change in operating configuration of the portable computer system 20 decreases electrical power consumption and therefore will ultimately result in a lower ambient temperature, it will likely reduce electrical power consumption to immediately reduce cooling. Reducing cooling is likely the best strategy for conserving electrical power following a reduction in electrical power consumption, even if latent heat stored within the component may ultimately requires increasing cooling for an interval to maintain the ambient temperature below a pre-established maximum allowable temperature indicated in FIG. 2 by a dashed line 116.

FIG. 3 depicts an ensemble of sets of temperature history data 222 collected for various operating configurations of the portable computer system 20, i.e. configuration 1, 2, . . . n, at various ambient temperatures, i.e. $t_1$, $t_2$ . . . $t_n$. For the system illustrated above in Table 1, there are seven (7) distinct system components which may at any moment be in either one or the other of two (2) states, i.e. either on or off. Theoretically there can exist no more than $2^n$ different operating configurations for the portable computer system 20, e.g. $2^7$. However, in reality there exist significantly fewer operating configurations than $2^n$ because, for example, only when the state of the CPU 22 is "on" can the LCD 24, PC Card controller 26, hard disk 28, etc. be properly in the "on" state.

Before the portable computer system 20 has collected a sufficient amount of temperature history data 222 to develop a thermal model, while the portable computer system 20 operates in any particular configuration collection and preservation of thermal data, such as that listed in Table 1, continues in the appropriate temperature history data 222, illustrated in greater detail in FIG. 4, at selected time intervals "$Time_i$" after entering that operating configuration. Because temperatures are more likely to change soon after changing configurations rather long after that event occurs, the duration of time intervals "$Time_i$" are preferably spaced closer together immediately after changing operating configuration and spaced further apart longer after that event occurs, e.g. spaced logrithmatically. The data preserved in each temperature history data 222 includes the temperature control strategy then operating in the portable computer system 20 together with temperatures at various locations 1, 2, . . . n, throughout the portable computer system 20. As indicated in FIG. 3 and described above, in addition to collecting sets of different temperature history data 222 for each configuration, different sets of temperature history data 222 are also saved for different ambient temperatures, i.e. $t_1$, $t_2$ . . . $t_n$, which are preferably spaced uniformly apart, e.g. 5.0° C. or 2.0° C.

Because the temperature history data 222 for a particular configurations at a particular ambient temperature $t_j$ will vary depending upon the immediately preceding configuration, separate temperature history data 222a–222g in the illustration of FIG. 3, are collected following entry to operating configuration$_i$ from operating configuration$_x$. For example the temperature history data 222 collected after entering a particular operating configuration$_i$, e.g. with the floppy diskette drive 34 operating, will certainly differ if in the immediately preceding configuration$_x$ the hard disk was either on or off. After collecting a sufficient quantity of temperature history data 222 for various configuration$_i$ following transitions from configuration$_x$ at a particular ambient temperatures $t_j$, the portable computer system 20 may use the data thus collected as a thermal model for the portable computer system 20 to predict a thermal trend used in effecting a temperature control strategy upon leaving configurations$_x$ to begin operating in configurations$_i$ at ambient temperature $t_j$, Initial collection of the temperature history data 222 can occur during factory burn-in of the portable computer system 20 after final assembly. Such testing proceeds in accordance with an algorithm which ensures that all configuration transitions are appropriately exercised.

A conservative thermal management strategy dictates that, if while using the temperature history data 222 as a thermal model for the portable computer system 20 to effect a temperature control strategy, at a particular time $Time_k$ after entering configurations$_1$ with ambient temperature $t_j$ the measured temperature at location$_1$ is higher than the temperature for that location stored in the corresponding temperature history data 222, the higher measured temperature is stored into the temperature history data 222 to replace the lower temperature. Conversely, adopting such a conservative thermal management strategy dictates that a lower measured temperature at $Time_k$ should never be stored into the temperature history data 222 to replace a higher temperature value stored there.

In the illustration of FIG. 1 the thermal management controller 102 is depicted in a way which implies its implementation entirely in hardware such as in an IC. Depending upon implementation details which will most likely vary among different system designs, it is likely that the thermal management controller 102 may be more advantageously implemented by an IC combined with a computer program executed by the CPU included in the portable computer system 20. Specifically, it appears highly advantageous to include a software portion of the thermal management controller 102 in the PMR for the portable computer system 20. Also, the preceding text describing one strategy for collecting temperature history data 222 and developing a thermal management strategy therefrom is merely illustrative. The precise method employed for collecting temperature history data 222 and the precise thermal management strategy employed are likely to depend upon unique characteristics of various different electrically powered systems to which the present invention may be applied.

Although the present invention has been described in terms of the presently preferred embodiment, it is to be understood that such disclosure is purely illustrative and is not to be interpreted as limiting. consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A method for thermal management within an electrically powered system comprising the steps of:

monitoring from time-to-time electrical power consumption within the system;

monitoring from time-to-time temperature within the system;

developing over time a thermal model for the system from the monitored electrical power consumption and system temperature;

using the thermal model, the presently sensed electrical power consumption, and the system temperature to predict a thermal trend for the system; and applying the predicted thermal trend of the system for effecting a temperature control strategy within the electrically powered system.

2. The method of claim 1 wherein the step of monitoring electrical power consumption within the system includes directly monitoring electrical current supplied to the system.

3. The method of claim 1 wherein the step of monitoring electrical power consumption within the system includes directly monitoring an electrical signal within an electrical power converter that supplies electrically power to the system to thereby indirectly determine electrical current supplied to the system.

4. The method of claim 3 wherein the electrical signal is monitored within an alternating-current ("AC") electrical power converter included in the system.

5. The method of claim 3 wherein the electrical signal is monitored within a direct-current to direct-current ("DC-DC") electrical power converter included in the system.

6. The method of claim 5 further comprising the step of supplying electrically power to the DC-DC electrical power converter from a battery included in the system.

7. The method of claim 1 wherein the step of monitoring temperature within the system includes monitoring voltage present across a thermistor included in the system.

8. The method of claim 1 wherein the step of generating over time thermal model for the system includes storing thermal modeling data in a data storage device included in the system.

9. The method of claim 1 wherein the step of applying the predicted thermal trend of the system for effecting a temperature control strategy for the system includes turning-on a fan included in the system.

10. A thermal management controller adapted for use effecting a temperature control strategy within an electrically powered system for which a thermal trend may be predicted using a thermal model, the thermal management controller comprising:

a power consumption detection circuit for monitoring from time-to-time electrical power consumption within the system for use in predicting the thermal trend of the system using the thermal model;

an temperature sensing circuit for monitoring from time-to-time temperature of the system for use in predicting the thermal trend of the system using the thermal model; and a temperature control circuit for effecting the temperature control strategy within the system.

11. The thermal management controller of claim 10 wherein said power consumption detection circuit directly monitors electrical current supplied to the system.

12. The thermal management controller of claim 10 wherein said power consumption detection circuit directly monitors an electrical signal within an electrical power converter that supplies electrically power to the system to thereby indirectly determine electrical current supplied to the system.

13. The thermal management controller of claim 12 wherein said electrical signal is monitored within an AC electrical power converter included in the system.

14. The thermal management controller of claim 12 wherein said electrical signal is monitored within a DC-DC electrical power converter included in the system.

15. The thermal management controller of claim 10 wherein said temperature sensing circuit monitors voltage present across a thermistor included in the system.

16. The thermal management controller of claim 10 wherein said temperature control circuit effects the temperature control strategy by turning-on a fan included in the system.

* * * * *